United States Patent [19]
Wagensonner et al.

[11] Patent Number: 5,933,585
[45] Date of Patent: *Aug. 3, 1999

[54] METHOD AND DEVICE FOR IMAGE PROCESSING

[75] Inventors: Eduard Wagensonner, Aschheim; Freidhrich Hujer, Petershausen, both of Germany

[73] Assignee: AGFA-Gevaert Aktiengesellschaft, Leverkusen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/751,131

[22] Filed: Nov. 15, 1996

[30] Foreign Application Priority Data

Dec. 7, 1995 [DE] Germany ............ 1945626.2-31

[51] Int. Cl.⁶ ............................................ G06K 15/00
[52] U.S. Cl. ................................. 395/115; 395/117
[58] Field of Search ................... 395/112, 114, 395/115, 106, 834, 858, 882, 884, 892, 893; 345/520, 521, 526, 511; 355/71, 77; 358/450, 451, 452, 462, 474, 401, 403, 302, 524

[56] References Cited

U.S. PATENT DOCUMENTS

| | | | |
|---|---|---|---|
| 4,712,909 | 12/1987 | Oshikoshi | 355/20 |
| 4,802,019 | 1/1989 | Harada et al. | 358/335 |
| 4,805,039 | 2/1989 | Otake et al. | 358/335 |
| 4,903,068 | 2/1990 | Shiota | 355/20 |
| 4,920,423 | 4/1990 | Shiota | 358/335 |
| 4,924,509 | 5/1990 | Yokomizo | 382/50 |
| 4,933,773 | 6/1990 | Shiota et al. | 358/302 |
| 5,038,298 | 8/1991 | Matsumoto et al. | 358/401 |
| 5,068,905 | 11/1991 | Hackett et al. | 382/47 |
| 5,184,227 | 2/1993 | Foley | 358/302 |
| 5,229,810 | 7/1993 | Cloutier et al. | 355/40 |
| 5,396,288 | 3/1995 | Tsugita et al. | 348/229 |
| 5,440,401 | 8/1995 | Parulski et al. | 358/342 |
| 5,757,471 | 5/1998 | Itoh et al. | 355/71 |

FOREIGN PATENT DOCUMENTS

| | | |
|---|---|---|
| 0308967 | 3/1989 | European Pat. Off. . |
| 0543233A1 | 6/1992 | European Pat. Off. . |
| 0615154A1 | 3/1994 | European Pat. Off. . |
| 0629908 | 12/1994 | European Pat. Off. . |
| 3628917 | 2/1987 | Germany . |
| 4120457C2 | 11/1995 | Germany . |
| 5122604 | 10/1991 | Japan . |

OTHER PUBLICATIONS

Konica Picture MD System Brochure Jul. 28, 1997.
Konica Digital Imaging System Features Brochure Jul. 28, 1997.
Konica CRT Printer DP–8180 Jul. 28, 1997.

*Primary Examiner*—Arthur G. Evans
*Attorney, Agent, or Firm*—Milde, Hoffberg & Macklin, LLP

[57] ABSTRACT

A method and apparatus for the processing of images which are stored on a medium, having images which are electronically raster scanned and then subject to signal processing. The image signals for each image are processed electronically at least two times, with different parameters, and each of the processed image signals is sent to a single printing device. For example, the parameters may describe size, orientation, format, or composite printing, e.g., of an index print.

27 Claims, 2 Drawing Sheets

METHOD AND DEVICE FOR IMAGE PROCESSING

FIELD OF THE INVENTION

The present invention relates to a method and a device for image processing stored images, in which the images are raster scanned electronically, signal processed and the image reproduced.

BACKGROUND OF THE INVENTION

Methods of electronically raster scanning images, processing the electronic signal, and reproducing the image in a printing device, have been known for a long time. In EP 0,308,967 A2, for example, a device is described in which images which have been stored optically on photographic film are optoelectronically scanned with a camera, and the resulting image signals are subjected to an electronic image-processing process. In this electronic image-processing scheme, each of the scanned images is collected in a memory until all of the images on the particular photographic film to be scanned have been completely stored. To do this, the film is transported across both a scan aperture and a print framing aperture in which the images are photographed by the color camera in the one case, and are printed directly to photographic material in the other. After all of the images have been scanned and printed in this way, the electronically generated overview print, with all of the images contained on the film, is exposed onto the photographic material, jointly in a single process, by means of a cathode-ray tube device. Such overview prints which belong together in one photographic job are known as index prints. EP 0,629,908 A2 also describes a system producing index prints in the above-described manner. In this system as well, each of the originals is first reproduced optically onto a print material, the originals are scanned optoelectronically, and the electronically generated overview print is later exposed onto a print material.

In DE 36 28 917 A1, a system is also described in which images from a color film are scanned with a video camera. In this case, the images are provided with additional information in a picture composition section, and are then exposed onto photographic material by means of a cathode-ray tube exposing unit. In this system, pictures which are made up of a composite of several originals from the color film are not provided. In the picture composition section, lettering and symbols are added only for documentation purposes.

SUMMARY OF THE INVENTION

The present invention provides a system and method for the processing of image media, on which numerous images are stored on the medium, in conjunction with which prints of the individual images in different variations can be created quickly and easily. In particular, the present invention provides both prints of the individual images as well as a composite picture of multiple images.

It is therefore an object of the invention to provide a method and apparatus for the processing of images which are stored on a medium, in conjunction with which the images are electronically raster scanned, and the electronic image signals pass through a signal-processing stage, wherein the image signals for each image are processed electronically at least two times, with different parameters, and each of the processed image signals is sent to a single printing device. The images are, for example, optically stored on a photographic film, and the scanning is carried out optoelectronically.

It is also an object of the present invention to provide a method and apparatus wherein the different image parameters result in different picture formats and/or a different number of output pictures when printing the images in the printing device.

It is a further object of the invention to provide a method and apparatus wherein the image signals are on the one hand directed picture-by-picture to the printing device, and on the other, are directed to a composition system in which several images from the medium are composed into an overview or index print. The overview print is, for example, output on the printing device after the printing of the individual pictures.

It is another object according to the present invention to provide a method and apparatus wherein the stored images are encoded optically on a video disk, magnetically on a magnetic medium, or digitally in a semiconductor memory.

It is a still further object of the invention to provide a method and apparatus in which, in at least one signal processing channel, e.g., for the composition means, the volume of data representing the image signals of a given image is reduced. Thus, the composition signal processing channel need not retain all of the raster-scanned information from the scanner. The data reduction may be, for example, carried out by means of filtering, in which in each case, several input image signals are utilized in the computation of one output image signal.

It is also an object of the present invention to provide a method and apparatus in which the recorded image signals are directed to a common signal-processing stage before the separate processing in the picture composition stage and a printer processing stage.

It is a further object of the invention to provide a method and apparatus wherein the image signals directed to the printer are stored temporarily before they pass through a node, to which the signals of composed pictures can be also be coupled.

Another object provides a method and apparatus wherein the images are stored in the medium as positive originals, and that during the signal processing, the image signals are inverted electronically in such a way that after being printed onto a negative print carrier, the prints are likewise positive. In this way, slide film and prints may be duplicated without use of an internegative.

It is also an object of the invention to provide a method and apparatus wherein the generation of the individual pictures and/or of the overview print are controlled by means of job-specific information for the processing of a film job, such as the number of prints per picture or the format of the prints. In one embodiment, the job-specific data is supplied via an interface from an external source. In another embodiment, the job-specific data are read from the original image storage medium.

It is also an object of the present invention to provide a method and apparatus for the processing of images which are stored on a medium, comprising an electronic image raster scanning means; a signal processing system for the processing of scanned image signals; and means for, on the one hand directing the scanned image signals directly to a printer, and on the other hand, directing the scanned image signals to a composition means in which several images from the medium can be stored and composed into an overview print. The directing means preferably includes at least one image memory. The medium is preferably a photographic film, and the scanning means is preferably an optoelectronic imaging device.

In accordance with the present invention, the electronically generated image signals are electronically processed in image form at least two times, with differing parameters. Each of the electronically processed image signals is then sent to a single printing device. Particularly for the parallel generation of individual prints and an overview print of all the images of one print job, the scanned image signals of each image are sent both directly to a printing device by means of which prints of the individual pictures are created, as well as to a composing means in which several images from the recording medium are composed together into an overview print. After the printing of the individual pictures, the overview print is output as a positive image by a single printer. It is noted that there may be multiple overview prints, for example each containing a subset of the images on the film. Generally, these overview prints will be presented in the same order as the film, however, this need not be the case, and they may be organized by subject, format, chronology, or in another desired organization.

Therefore, the pictures can be very quickly generated as individual, single prints on the one hand, and on the other, the associated overview print can be output immediately after the completion of the individual prints, arranged, e.g., in chronological order according to the corresponding individual prints.

The originals can be stored optically on a photographic film or an optical video disk, or magnetically on a magnetic medium such as a magnetic tape or a diskette, or digitally in a semiconductor memory.

The image signals directed to the composing means can pass through a filter in which the image-signal data is markedly compressed. This leads to an increase in speed in the generation of the composed pictures, and allows minimization of the amount of memory required to store the processed images during composing of the index print.

The image signals which are sent to the printer may be subject to a separate image-processing stage, much as the image signals being sent to the composing means. The image signals which are processed further in that way can be recomposed by means of a common coupling node, and then sent to the print stage for generation of a printed image.

In place of or in addition to the generation of the overview print, the image signals generated on a picture-by-picture basis may be used a number of times for different output variations of the individual pictures. Such output variations include, for example, duplicate output and/or multiple output in different formats.

These and other objects and features of the present invention will become more fully apparent from the following description and appended claims taken in conjunction with the accompanying drawings, in which like numerals refer to like parts.

DETAILED DESCRIPTION OF THE PREFERRED EMBODIMENT

Figure 1:
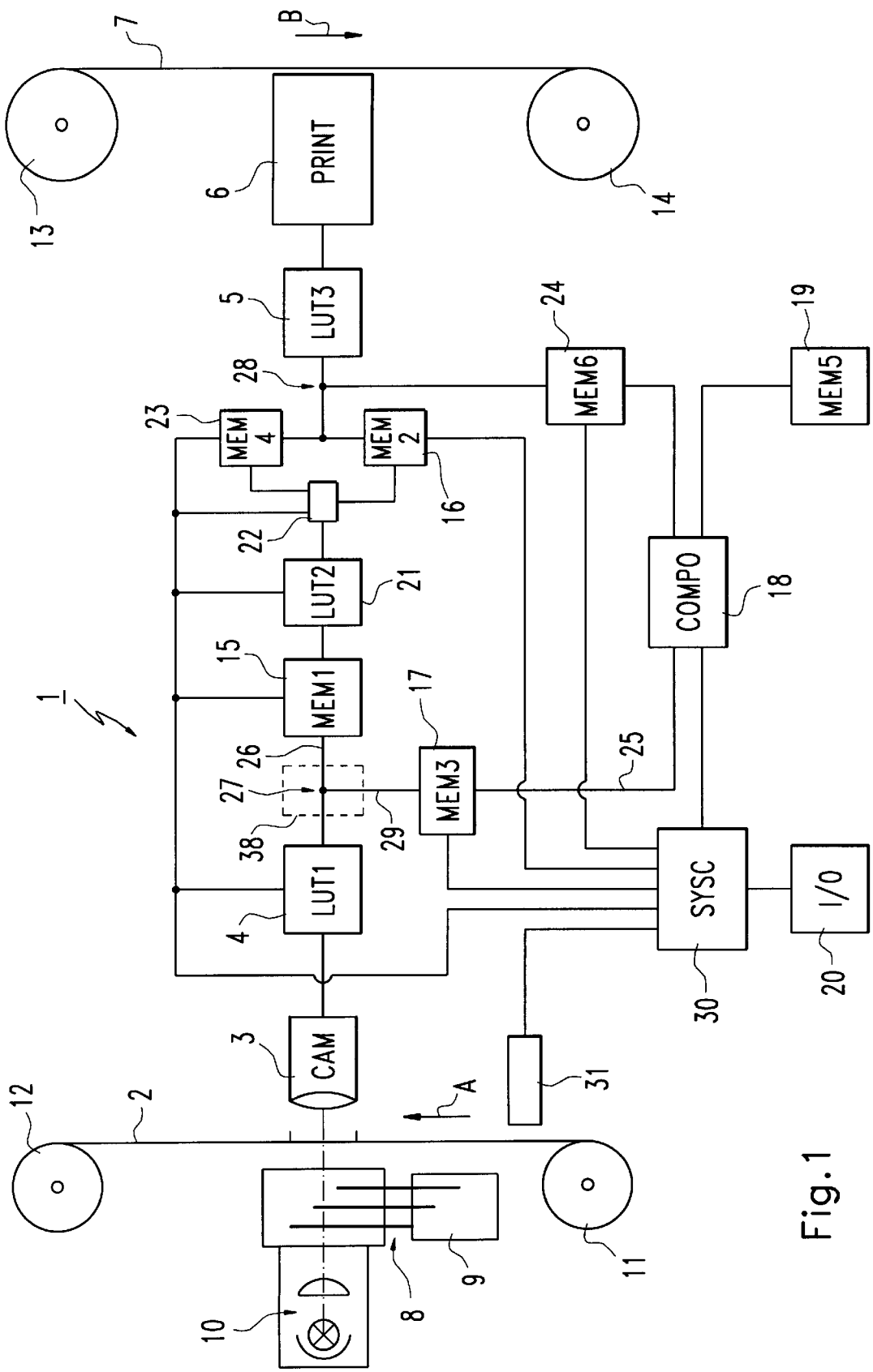
FIG. 1 shows an electronic image-processing system.

The invention will now be described by way of the drawings, in which corresponding reference numerals indicate corresponding structures in the figures.

FIG. 1 shows an electronic image-processing system 1. In this system, a photographic film 2 is re-spooled from a film spool 11 onto a film spool 12 in the direction A. The take-off spool 11 includes a number of individual films, which are assembled together into one large photo job by an appropriate system, using so-called splicing tapes. During the re-spooling, the film 2 passes through a scanning station. Inside this station, means can be provided to control the transport through the station with high precision, that is, with as constant a speed as possible. To accommodate variability in the speed of the spool drive, the film transport inside the scanning station can be de-coupled from the re-spooling process, by providing buffer loops before and after the scanning station, as well as separate drives for the re-spooling and the scanning systems.

In the scanning station, the film 2 is raster scanned (on a point-by-point basis) as a complete image by means of a suitable optoelectronic scanning means. Here, the scanning means includes a camera 3 with a CCD line sensor which scans the images stored on the film 2 on a line-by-line basis. Three scanning processes are provided for each line. A color filter 8 in one of the basic colors red, green or blue is rotated in front of a white exposure light source 10 for each scanning process. A corresponding filter control means 9 controls the rotating in or out of the color filter 8, to ensure an appropriate color balance.

As an alternative to the line-by-line serial scanning in the three basic colors, a three-color image sensor can be provided which records the image signals of the three colors simultaneously. In place of a CCD sensor, other known systems for the scanning of originals can also be used, such as so-called flying spot cameras.

After the scanning of the image signals, the scanned image signals are signal processed in a camera-specific manner in a signal-processing system 4, located within the film processing device 1, which may be internal or external to the camera 3. For this purpose, it is advantageous to employ so-called look-up tables. After passing through the scan-specific image signal-processing system 4, the image signals can be stored. However, that is not absolutely necessary. The processed image signals then proceed to a signal node 27 at which they are, on the one hand, written to an input memory 15 (MEM 1). On the other hand, the image signals from the node 27 are passed directly into the memory 17 (MEM 3) of a picture-composition circuit 18. The node 27 can be a data branch designed as a parallel circuit, or, for example, it can be implemented by means of an image-signal memory from which the image signals are directed into both of the above-mentioned signal channels simultaneously for separate additional processing in the two channels 26 and 29. An image signal memory 38 of such a type is indicated in FIG. 1. This type of memory is known as a dual port memory.

The dual port memory structure allows the first signal processing channel and the second image processing channel to operate without a common bus, and allows each channel to resume processing immediately after delivery of the image signals. Thus, according to the present invention, image signals follow buffered signal paths which allow multiple operations to occur concurrently. Because the images are high quality, e.g., greater than about 150 dpi in 24 bit color depth, the data rates for each image, between about 3.5×5 and 5×7 inches, results in a data flow of up to about 2.25 megabytes per picture. By buffering this image data at each substep of the process, prior signal processing components in each signal processing channel is free for processing of the next image. Where the first and second image processing channels merge, therefore, a dual port memory of buffer is provided to feed the common signal processing channel which prepares the images for printing on the single printer.

In channel 26, the image signals are directed to the print memory 15, while in channel 29 they are directed to the input image storage memory 17 of the composition circuit 18. The composition circuit 18 provides a superimposed picture layout image signal generated in the control computer 30. Memory 19, which is connected with composition circuit 18, stores predetermined layout masks which are appropriate for different types of output of the overview prints. These layout masks can be changed at any time by means of the system computer 30 and a data transfer interface 20. The image data, which is directed via the line 25 to the composition stage 18, can pass through a data compression stage in which the amount of data necessary to describe the image is reduced. A suitable data compression system, for example, is a decimation filter circuit with a 3×3 or a 9×9 filter, which calculates one new pixel value from every 9 or 81 image pixels.

The image signals from the input image memory 17, having image components for the generation of the index print are directed via the line 25 to the composition circuit 18. The composition circuit 18 passes the image signals to the image memory 24 (MEM 6), in which the images from one film have been stored in an ordered sequence, that is, in the same sequence as they are stored on the film 2. The combined image that has been generated in this way, defining the index print, is stored in the memory 24 until all of the images on the film have been read in, and the individual pictures have been output directly onto photographic print media 7 by the printer 6 via the printer signal-processing stage 21 and the image memories 16 and 23.

The image signals from the image memory 15 are directed through the printer data line 26 to an image-specific signal-processing stage 21, in which they are altered in an image-specific manner. From there, the images are delivered to a two-way switch 22, which directs the successive images to the output memories 16 (MEM 2) and 23 (MEM 4) one at a time on an alternating basis. This structure allows one memory 16, 23 to be read from while the other memory 23, 16 is being written to. From the two-way switch 22, the images can be sent to the signal-coupling node 28, from which they again go through an output-specific image-processing stage 5. The signal-coupling node 28 serves as a junction between the first signal processing channel and the second signal processing channel. The output-specific image-processing stage 5 adapts the image signals to the output characteristics of the exposure unit 6. The exposure unit 6 is a high-speed printer for exposing photographic output materials, in particular, color-negative (reversal) print material. The exposure unit consists, for example, of a powerful cathode-ray tube, a laser exposure unit or an LCD array working in conjunction with a bright light source, or a light-valve tube (a PLZT tube, for example). Of course, the exposure unit 6 may also be a high-speed printer which does not work with photographic material, for example, an ink-jet printer.

Each of the arriving images is output with the exposure unit 6 on an output medium 7. The output medium 7 in the present embodiment is photographic negative print material. The latter is re-spooled from a paper take-off spool 13 onto a take-up spool 14 in the direction B. For additional, direct photographic processing, however, as an alternative to the paper take-up spool, the print material can also be output directly into a photographic developing device in which the photographic paper 7 is subjected to a chemical developing process before it appears as a positive print. If the films 2 are color negatives and the photo paper 7 goes through a negative-development process, the electronic signal processing of the image signals takes place as described above. If the films 2 are positive originals or if, for example, the images stored on the medium 2 of an optical video disk have been stored as positives, then an additional inversion stage, for example, in accordance with German patent DE 35 25 807 C, is provided within the electronic image processing stages. This electronic inversion stage inverts the positive-scan image into a negative image, which is then exposed onto negative print material 7 via the output stage 6. After the subsequent chemical development processing of the negative print material, the print of the picture that is output is once again seen as a positive image.

At the end of a job, that is, when all of the individual images from a film have been output at the printer 6, the index print is output from the memory 24 to the printer 6. Thus, the index print is automatically sequenced to be output at the end of the other pictures of that job.

At the signal-coupling node 28, each of the image signals read from the memories 16, 23 and 24 can be passed on to the image-processing stage 5. The entire flow of data, in particular, the reading of the image signals in and out of the different memories, as well as the processing of the image signals in the look-up tables, is monitored by the control computer 30. The control computer 30 can receive job-related data via the interface 20. For example the number of prints which are desired for each picture can be indicated for each film job, and the signal-processing stages can be controlled accordingly. A desired print format, e.g., 9×13 cm, 10×15 cm, of the so-called 2:3 standard format can also be indicated, as well as other formats of the 16:9 high-vision format or the 1:3 panorama format. In addition, data can be read on a film-by-film or picture-by-picture basis directly from the film 2 by means of a read device 31, for example, a magnetic reader or an optoelectronic read device, or can be accessed from a job storage medium, such as a job card or a diskette. It is also possible to receive a direct transfer of the data from the customer by means of a home computer and/or a general data network such as the Internet. By means of this data, the computer 30 controls both the generation of the individual images in the data channel 26, as well as the generation of the index print in the channel 25, 29.

The pictures may be generated in multiples, up to the desired number of pictures, by means of the multiple, serial creation of the individual pictures, by reading of the image signals of an image from the memories 16, 23 multiple times, one after the other, for each picture. In addition, a layout corresponding to the desired format of the picture is read from the memory 19, for control of the generation of the index print, and/or the output of the individual images in channel 26. The layout can be automatically varied both on a picture-by-picture basis in the channel 26, if various pictures from one film have different formats, as well as overall for an index print in channel 25, for example, if all of the pictures from one film have one specific format.

Figure 2:
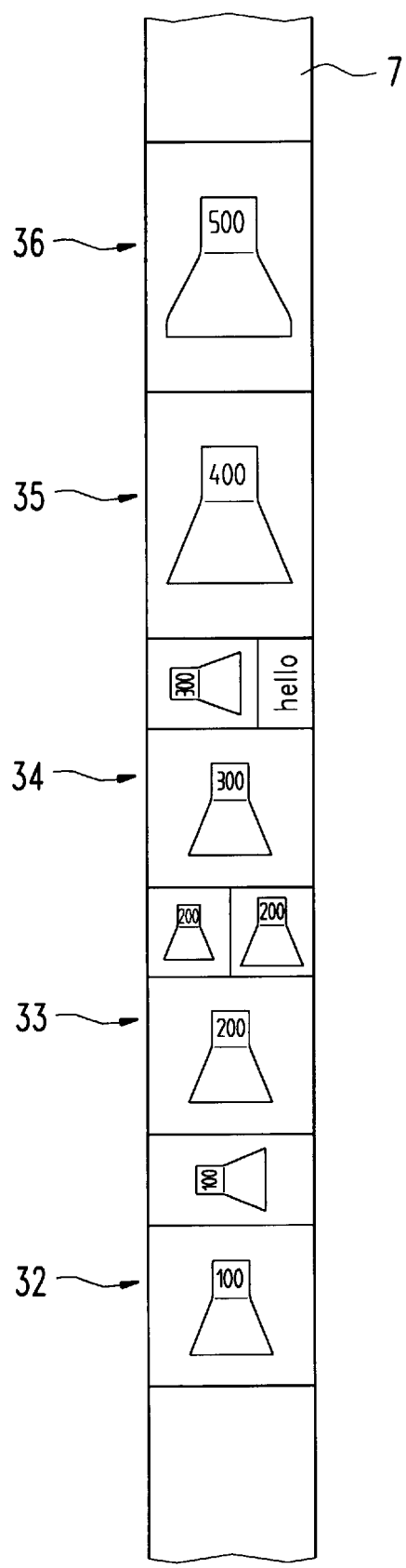
FIG. 2 shows an exposed photographic material.

For adapting the image signals to the desired picture format and/or to the desired orientation of the picture (portrait/landscape format), a format processing stage can be provided in channel 26. The latter can include both electronic signal filters, interpolation stages or decimation stages, as well as memory elements from which the image signals can be read either column-by-column or line-by-line as desired. The signal-coupling node 28 can be configured as, for example, a two-way switch by means of an appropriate multiplex circuit, or as an electronic image memory which is controlled by a controlling means so that the particular image signals desired are forwarded from the memories 16, 23 or 24 to the printing stage 5, 6. In a preferred embodiment, the signal-coupling node 28 is a dual port memory system, receiving inputs from either the memories 16, 23 or the memory 24. Since the size of this memory is within the scope of monolithic memory devices, a monolithic dual port memory integrated circuit or set of such circuits, such as the so-called V-RAM, may be provided to efficiently perform this function FIG. 2 shows an example of the way in which sequential images can be exposed onto the recording medium 7, in this case photographic paper. Both of the images 35, 36 were exposed simply, that is, once each in a specific format, on the recording medium 7. In contrast, the images 32, 33 and 34 were each exposed several times on the recording medium 7. Image 32 has been exposed twice in differing formats (a so-called duoprint). In the case of image 33, one of the two formats has been exposed twice (a so-called triprint), and in the case of image 34, one of the two formats has been given a special layout, here, a greeting-card layout.

In the facility in accordance with FIG. 1, such multiple outputs of one picture subject are possible with no additional structures needed, since the electronic image signals stored in one memory, for example memory 15 or memory 17, are sent through the print stage 5, 6 multiple times. A format-specific conversion of the image signals can be carried out in one of the signal-processing stages 4, 18 or 21 under the control of the computer 30. When that is done, the image signals can be manipulated in such a way that the picture that is output is controlled in terms of its size and/or orientation. A method for electronic zooming and/or changing of the orientation of the picture on the recording material 7 is known from German Patent DE 41 20 457 C2, for example.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. Consequently, the full scope of the invention should be ascertained by the appended claims. By way of example, additional image memories can be provided in order to separate, in terms of time, the image-processing processes between individual processing stages. In accordance with the present invention, for example, the architecture may be modified so that, before the separate forwarding of the image signals, the signal-processing processes which are needed for both output channels are carried out, for example, the printer-specific signal processing.

What is claimed is:

1. A method for processing of a plurality of images stored on a medium, which are electronically raster scanned and then electronically processed, comprising the steps of electronically processing the image signals for each image in at least two distinct image data paths, an image signal in a first data path being processed according to different parameters than an image signal in a second data path; the image in the one of the data paths being formatted as an overview print image having a composite representation including image signal data derived from a plurality of images, and sending each of the processed image signals to a single printing device, having a single image printing location, at different times.

2. The method in accordance with claim 1, wherein the parameters comprise picture format to be output by the printing device.

3. The method in accordance with claim 1, wherein the first data path sends an image signal representing a single image to the printing device, and a second data path sends a composed overview print image representing a plurality of images to the printing device.

4. The method in accordance with claim 3, wherein the printing device prints the single image from the first data path before printing the overview print from the second data path.

5. The method in accordance with claim 1, wherein the images are optically stored on a photographic film, and that the scanning is carried out optoelectronically.

6. The method in accordance with claim 1, wherein the images are stored in a manner selected from the group consisting of optically on a video disk, magnetically on a magnetic medium, and digitally in a semiconductor memory.

7. The method in accordance with claim 3, wherein the image signals in the second data path are compressed to reduce an amount of data.

8. The method in accordance with claim 7, wherein the data reduction is carried out by means of filtering.

9. The method in accordance with claim 3, wherein the first data path and second data path share an initial common signal processing path and the second data path has a subsequent separate image composing path, before the sending of the processed image signals to the single printing device.

10. The method in accordance with claim 1, further comprising the step of storing the processed image temporarily before sending to the single printing device, wherein the image signals directed to the single printing device from the first data path are stored temporarily, the temporarily stored image signals from the first data path and the processed image signal from the second data path being coupled through a node to the single printing device.

11. The method in accordance with claim 1, wherein the images are stored in the medium as positive originals, further comprising the step of electronically inverting the image signals so that, after being printed onto a reversal print material, the prints are positive.

12. The method in accordance with claim 1, wherein the parameters of the image signal processing in the first data path and the second data path are controlled by means of job-specific processing information, further comprising the step of receiving the job-specific processing information.

13. The method in accordance with claim 12, wherein the job-specific processing parameters is received through an external data interface.

14. Method in accordance with claim 13, wherein the job-specific processing parameters are read from the storage medium containing the images.

15. A device for the automated processing of images which are stored on a medium, with electronic raster scanning means for scanning images and a signal processing device for processing the scanned image signals, comprising means for selectively providing image signals through a first data path directly to a printer and through a second data path, distinct from said first data path, to a composition means for receiving a plurality of image signals, storing said image signals, and composing an overview print from said stored plurality of image signals, the image signals from the first data path and the second data path each being supplied to a single printer having a single printing location.

16. The device in accordance with claim 15, wherein said means for selectively providing comprises a dual port image memory.

17. The device in accordance with claim 15, wherein the medium is a photographic film, and that the scanning means comprises an optoelectronic scanner.

18. An apparatus for the automated processing of stored images, comprising:

an electronic raster scanner for scanning stored images to produce scanned image signals;

a signal processing device for processing the scanned image signals;

distinct first and second image data paths, at least one of which receiving processed image signals from said signal processing device, said second data path comprising a composition means for receiving a plurality of image signals, storing said image signals, and composing an overview print from said stored plurality of image signals;

means for buffering image signals passing through said first and second data path; and an image recording device having a single image recording location, receiving the buffered image signals from said first data path and said second data path.

19. The apparatus according to claim 18, wherein said first and second data paths do not share a common data bus.

20. The apparatus according to claim 18, wherein said image data in said second data path is stored in a buffer simultaneously with output of image data from said first data path to said image recording device.

21. The method according to claim 1, wherein the overview print image includes a set of representations of each of a plurality of images, each representation having an identifiable source image.

22. The method according to claim 15, wherein the single printing device is a digital photographic exposure device having a single optical path to expose a photographic medium.

23. The method according to claim 22, wherein the single printing device sequentially prints images on a recording medium at adjacent locations of a recording medium.

24. The method in accordance with claim 1, wherein the parameters comprise number of picture copies, to be output by the printing device.

25. The method in accordance with claim 1, wherein an image polarity of an image is selectively inverted based on a polarity of the images stored on the medium, thereby allowing printing of positive and negative polarity images on a single type of print material.

26. The method according to claim 1, wherein the single printing device prints an image from the first data path before all data is available for composing the overview print from the second data path.

27. The apparatus according to claim 18, wherein said signal processing device receives the scanned image signals simultaneously with image signals being provided from said providing means to said image recording device.

* * * * *